(12) United States Patent
Ito et al.

(10) Patent No.: US 11,855,542 B2
(45) Date of Patent: Dec. 26, 2023

(54) POWER-SUPPLY CONTROL DEVICE

(71) Applicant: Yazaki Corporation, Tokyo (JP)

(72) Inventors: Satoshi Ito, Susono (JP); Keisuke Kanda, Susono (JP); Shota Yoshimitsu, Susono (JP)

(73) Assignee: YAZAKI CORPORATION, Tokyo (JP)

(*) Notice: Subject to any disclaimer, the term of this patent is extended or adjusted under 35 U.S.C. 154(b) by 25 days.

(21) Appl. No.: 17/509,733

(22) Filed: Oct. 25, 2021

(65) Prior Publication Data

US 2022/0131472 A1    Apr. 28, 2022

(30) Foreign Application Priority Data

Oct. 26, 2020  (JP) ................. 2020-178723

(51) Int. Cl.
*H02M 1/00* (2006.01)
*H02M 1/36* (2007.01)
(Continued)

(52) U.S. Cl.
CPC ......... *H02M 3/33576* (2013.01); *H02M 1/08* (2013.01); *H02P 27/06* (2013.01)

(58) Field of Classification Search
CPC .. H02M 3/33576; H02M 1/08; H02M 3/1584; H02M 7/48; H02M 1/36;
(Continued)

(56) References Cited

U.S. PATENT DOCUMENTS 8,779,716 B2 * 7/2014 Fotherby ................. H02M 1/44
                                                          363/71
2012/0080940 A1   4/2012 Larsen
(Continued)

FOREIGN PATENT DOCUMENTS

EP     3 654 516 A1    5/2020
JP    2010-119257 A    5/2010
(Continued)

OTHER PUBLICATIONS

"The Garo shower priority unit", 2019, David Savery Electrical Services, https://www.youtube.com/watch?v=N_iTZbpUfTc, 1 page total.

*Primary Examiner* — Daniel Kessie
*Assistant Examiner* — Xuan Ly
(74) *Attorney, Agent, or Firm* — Sughrue Mion, PLLC

(57) ABSTRACT

A power-supply control device capable of reducing a size of a power-supply device including a main power-supply and a plurality of auxiliary power-supply systems and stably supplying electric power to the plurality of auxiliary power-supply systems is provided. The power-supply control device includes a DC/DC converter that steps down a power-supply voltage from a main battery and outputs the stepped-down power-supply voltage to a first auxiliary power-supply system and a second auxiliary power-supply system; and a controller that stops supply of electric power from the DC/DC converter to the second auxiliary power-supply system when a load of a heater is in a predetermined high-load state, and supplies electric power from the DC/DC converter to the second auxiliary power-supply system when the load of the heater changes from the predetermined high-load state to a predetermined low-load state.

8 Claims, 5 Drawing Sheets

(51) Int. Cl.
  *H02M 3/335* (2006.01)
  *H02M 3/158* (2006.01)
  *H02M 1/08* (2006.01)
  *H02P 27/06* (2006.01)

(58) Field of Classification Search
  CPC .. H02M 3/33573; H02M 1/007; H02M 1/008; H02P 27/06
  USPC ........................................................... 307/18
  See application file for complete search history.

(56) References Cited

U.S. PATENT DOCUMENTS

| | | | |
|---|---|---|---|
| 2013/0235098 A1* | 9/2013 | Umeda | B41J 29/38 |
| | | | 307/116 |
| 2013/0253722 A1* | 9/2013 | Nakamura | B60R 16/03 |
| | | | 700/295 |
| 2014/0304528 A1 | 10/2014 | Huang et al. | |

FOREIGN PATENT DOCUMENTS

| | | |
|---|---|---|
| JP | 2011-10406 A | 1/2011 |
| JP | 2011010406 | * 10/2011 |

* cited by examiner

POWER-SUPPLY CONTROL DEVICE

CROSS-REFERENCE TO RELATED APPLICATIONS

This application is based on and claims priority under 35 USC 119 from Japanese Patent Application No. 2020-178723 filed on Oct. 26, 2020, the contents of which are incorporated herein by reference.

TECHNICAL FIELD

The present invention relates to a power-supply control device.

BACKGROUND ART

As a power-supply device that converts a voltage of a single main power-supply and outputs the converted voltage to a plurality of auxiliary power-supply systems, there is known a power-supply device including: a switching power-supply circuit that steps down a DC voltage from a main power-supply and outputs the stepped-down DC voltage to a first auxiliary power-supply system to which a high-voltage auxiliary device, an electric power steering, or the like is connected; and a step-up/step-down chopper circuit that steps down a DC voltage from the first auxiliary power-supply system and outputs the stepped-down DC voltage to a second auxiliary power-supply system to which a low-voltage auxiliary device or the like is connected (for example, see Patent Literature 1). In the power-supply device disclosed in Patent Literature 1, choke coils are provided, as power converters, on a secondary side of a transformer in the switching circuit, the first auxiliary power-supply system, and the second auxiliary power-supply system, respectively.

CITATION LIST

Patent Literature

Patent Literature 1: JP-2010-119257-A

SUMMARY OF INVENTION

Since a magnetic component such as a choke coil constituting a power converter has a large occupied area, a size of a power-supply device is increased. In the power-supply device disclosed in Patent Literature 1, since the choke coil is provided not only on the secondary side of the transformer in the switching circuit and on the first auxiliary power-supply system side in the step-up/step-down chopper circuit, but also on the second auxiliary power-supply system side in the step-up/step-down chopper circuit, an increase in size of the device cannot be avoided.

Here, although it is possible to reduce the size of the power-supply device by reducing the number of choke coils, it is necessary to prevent the stable supply of electric power to the plurality of auxiliary power-supply systems from being impaired.

The present invention has been made in view of the above circumstances, and an object of the present invention is to provide a power-supply control device capable of reducing a size of a power-supply device including a main power-supply and a plurality of auxiliary power-supply systems and stably supplying electric power to the plurality of auxiliary power-supply systems.

A power-supply control device of the present invention controls a power-supply device, the power-supply device including a first auxiliary power-supply system to which a heat generation electrical component driven by a first voltage is connected, a second auxiliary power-supply system to which a storage battery to be charged by a second voltage lower than the first voltage and a low-voltage load to be driven by the second voltage are connected, and a main power-supply, the power-supply control device including: a voltage conversion circuit that steps down a power-supply voltage from the main power-supply and outputs the stepped-down power-supply voltage to the first auxiliary power-supply system and the second auxiliary power-supply system; and a control unit that stops supply of electric power from the voltage conversion circuit to the second auxiliary power-supply system when a load of the heat generation electrical component is in a predetermined high-load state, and supplies electric power from the voltage conversion circuit to the second auxiliary power-supply system when the load of the heat generation electrical component changes from the predetermined high-load state to a predetermined low-load state.

DESCRIPTION OF EMBODIMENTS

Hereinafter, the present invention will be described in accordance with a preferred embodiment. The present invention is not limited to the embodiment described below, and the embodiment described below can be changed as appropriate without departing from the gist of the present invention. In the embodiment described below, some configurations are not illustrated or described, but it goes without saying that a known or well-known technique is applied as appropriate to details of an omitted technique within a range in which no contradiction occurs to contents described below.

Figure 1:
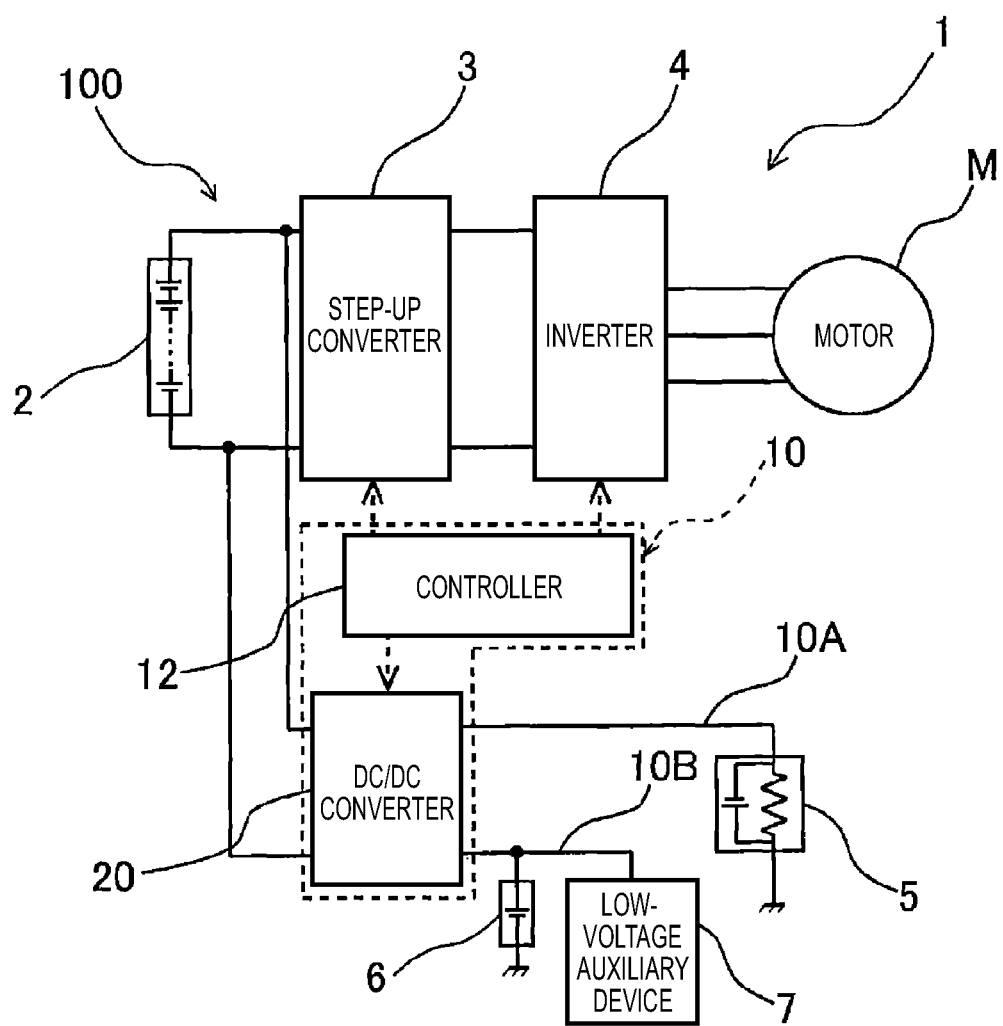
FIG. 1 is a diagram illustrating an electric vehicle including a power-supply control device according to an embodiment of the present invention.

FIG. 1 is a diagram illustrating an electric vehicle 1 including a power-supply control device 10 according to an embodiment of the present invention. As illustrated in FIG. 1, the electric vehicle 1 includes a motor M, a power-supply device 100, a heater 5, and a low-voltage auxiliary device 7. The power-supply device 100 includes a main battery 2, a step-up converter 3, an inverter 4, a sub-battery 6, and the power-supply control device 10. The electric vehicle 1 may be a hybrid vehicle that uses an internal combustion engine and the motor M as drive sources, or may be an electric vehicle that uses only the motor M as a drive source.

The motor M is used for driving the vehicle and is driven by electric power supplied from the main battery 2. The main battery 2 is a high-voltage battery that supplies electric power of a higher voltage (for example, 48V) than a voltage of an auxiliary power-supply system to be described later to the motor M and a DC/DC converter 20 to be described later. As the main battery 2, a lithium ion battery or the like can be exemplified. The step-up converter 3 steps up a DC voltage output from the main battery 2 and outputs the stepped-up DC voltage to the inverter 4. The inverter 4 converts the DC voltage output from the step-up converter 3 into an AC voltage and outputs the AC voltage to the motor M.

The power-supply device 100 includes a main power-supply system for supplying electric power to the motor M and an auxiliary power-supply system for supplying electric power to a load having a voltage lower than that of the motor M. The auxiliary power-supply system includes a first auxiliary power-supply system 10A to which the heater 5 serving as a heat generation electrical component is connected as a load, and a second auxiliary power-supply system 10B to which the low-voltage auxiliary device 7, which is a load having a voltage lower than that of the heater 5, is connected as a load. Examples of the heater 5 include a sheet heater, a defogger, and a catalyst heater. The power-supply control device 10 steps down a power-supply voltage of the main power-supply system and outputs the stepped-down power-supply voltage to the first auxiliary power-supply system 10A and the second auxiliary power-supply system 10B.

The power-supply control device 10 includes a controller 12 and the DC/DC converter 20. The controller 12 controls the step-up converter 3, the inverter 4, and the DC/DC converter 20. The controller 12 has a function of performing switching control of the step-up converter 3, a function of performing switching control of the inverter 4, and a function of performing switching control of the DC/DC converter 20, and is configured with a plurality of electric control units, micro processing units, or the like that communicates with one another.

Figure 2:
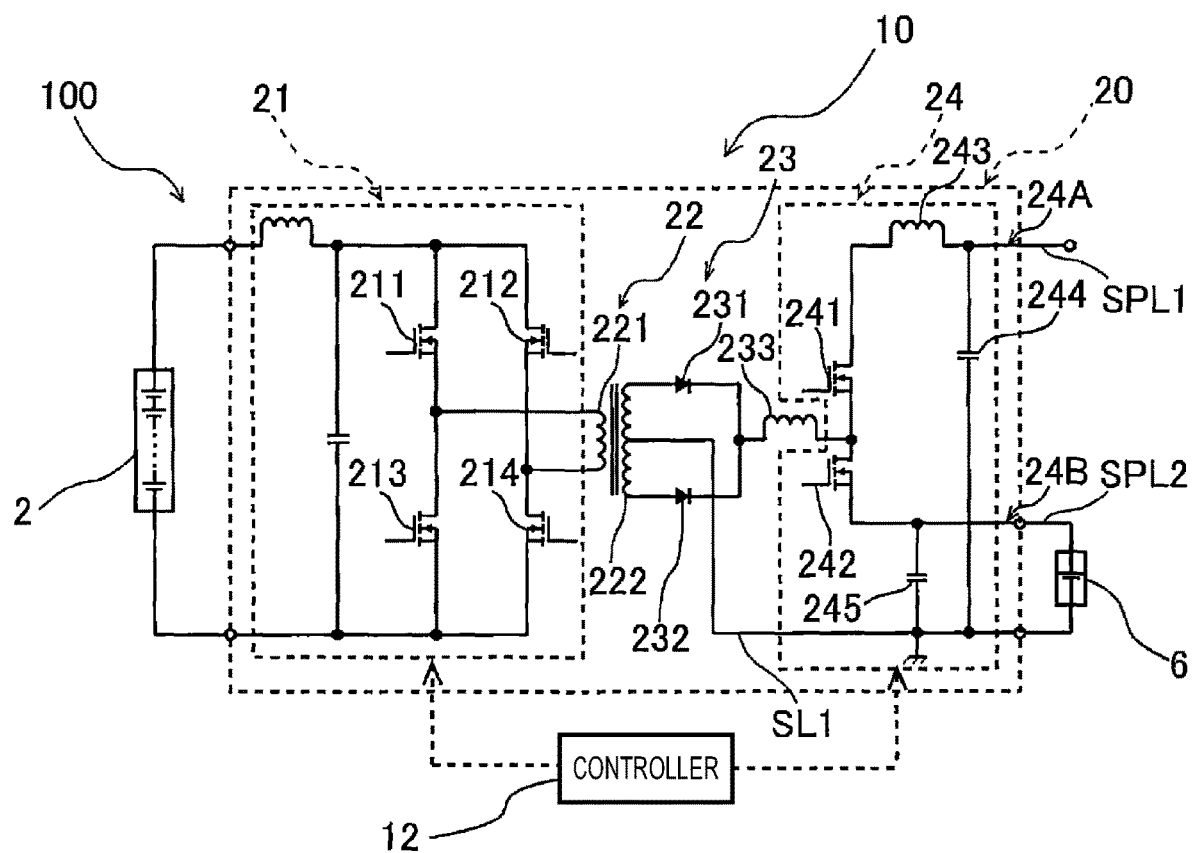
FIG. 2 is a diagram illustrating a circuit configuration of a DC/DC converter illustrated in FIG. 1.

FIG. 2 is a diagram illustrating a circuit configuration of the DC/DC converter 20 illustrated in FIG. 1. As illustrated in FIG. 2, the DC/DC converter 20 includes a first switching circuit 21, a transformer 22, a rectifier circuit 23, and a second switching circuit 24. The first switching circuit 21 is a full-bridge type switching circuit, and includes four switches 211, 212, 213, and 214. The switches 211 to 214 of the present embodiment are metal oxide semiconductor field effect transistors (MOSFETs). The switches 211 to 214 may be transistor switches other than MOSFETs. The switches 211 and 212 are high-side switches, and the switches 213 and 214 are low-side switches. The switch 211 and the switch 213 are connected in series, and the switch 212 and the switch 214 are connected in series.

The transformer 22 includes a primary coil 221 and a secondary coil 222. The primary coil 221 is connected to the first switching circuit 21, and the secondary coil 222 is connected to the rectifier circuit 23. One end of the primary coil 221 is connected to a wire that connects the switch 211 and the switch 213, and the other end of the primary coil 221 is connected to a wire that connects the switch 212 and the switch 214. A ground wire SL1 is connected to a center of the secondary coil 222. A ratio of the number of turns of the primary coil 221 to the number of turns of the secondary coil 222 is set so that the voltage is stepped down in the transformer 22.

In the first switching circuit 21, PWM control over the switches 211 to 214 is performed such that the switches 211 and 214 and the switches 212 and 213 are alternately turned on. Accordingly, a forward alternating voltage is generated on the secondary side of the transformer 22. Accordingly, by a switching operation of the switches 211 to 214 in the first switching circuit 21, a DC voltage output from the main battery 2 is converted into an AC voltage and is stepped down, and then the AC voltage is output to the rectifier circuit 23.

The rectifier circuit 23 includes a diode 231, a diode 232, and an inductor 233. An anode of the diode 231 is connected to one end of the secondary coil 222, and an anode of the diode 232 is connected to the other end of the secondary coil 222. A cathode of the diode 231 and the cathode of the diode 232 are connected to one end of the inductor 233. When the switches 211 and 214 are ON, AC electric power output from the secondary coil 222 is rectified into DC electric power by the diode 232 and the inductor 233. On the other hand, when the switches 212 and 213 are ON, the AC electric power output from the secondary coil 222 is rectified into DC electric power by the diode 231 and the inductor 233. The inductor 233 is a choke coil, and electric power output from the secondary coil 222 accumulates therein.

The second switching circuit 24 is a DC/DC switching power-supply circuit of a single-inductor multi-output (SIMO) type, and can output two types of electric power having different voltages from each other from a single inductor 233. The second switching circuit 24 includes a first output system 24A and a second output system 24B. The first output system 24A includes a first switch 241, an inductor 243, and a capacitor 244. The second output system 24B includes a second switch 242 and a capacitor 245. It is not essential that the first output system 24A includes the inductor 243, and when the first output system 24A does not include the inductor 243, a size of the DC/DC converter 20 is further reduced.

The first switch 241 and the second switch 242 of the present embodiment are MOSFETs. The first switch 241 and the second switch 242 may be transistor switches other than MOSFETs. A drain of the first switch 241 and a drain of the second switch 242 are connected to each other, and are connected to the other end of the inductor 233. A source of the first switch 241 is connected to one end of the inductor 243, and a source of the second switch 242 is connected to a second power-supply wire SPL2 and the ground wire SL1.

The other end of the inductor 243 is connected to a first power-supply wire SPL1. The first power-supply wire SPL1 is connected to the heater 5 (see FIG. 1). The capacitor 244 is connected to the first power-supply wire SPL1 and the ground wire SL1. The inductor 243 and the capacitor 244 smooth a DC voltage output from the inductor 233 and convert the DC voltage into a first voltage VL1. The first voltage VL1 is output from the first power-supply wire SPL1 to the first auxiliary power-supply system 10A (see FIG. 1).

The capacitor 245 is connected to the second power-supply wire SPL2 and the ground wire SL1. The capacitor 245 smooths the DC voltage output from the inductor 233 and converts the DC voltage into a second voltage VL2. Here, the second voltage VL2 is a voltage lower than the first voltage VL1, and is output from the second power-supply wire SPL2 to the second auxiliary power-supply system 10B (see FIG. 1).

The second power-supply wire SPL2 is connected to a positive terminal of the sub-battery 6, and the ground wire SL1 is connected to a negative terminal of the sub-battery 6. The sub-battery 6 is charged by DC electric power of the second voltage VL2 output from the second output system 24B. The low-voltage auxiliary device 7 (see FIG. 1) is connected to the second power-supply wire SPL2 and is driven by DC electric power output from the second output system 24B or the sub-battery 6.

The controller 12 performs PWM control over the switches 211 to 214 of the first switching circuit 21 and PWM control over the first switch 241 and the second switch 242 of the second switching circuit 24. Here, the control over the first switch 241 and the second switch 242 performed by the controller 12 differs depending on states of loads of the heater 5, the sub-battery 6, and the low-voltage auxiliary device 7. First, the control over the first switch 241 and the second switch 242 of the second switching circuit 24 performed by the controller 12 in a case where the load of the heater 5 or the like is in a low-load state will be described together with the control over the switches 211 to 214 of the first switching circuit 21.

Figure 3:
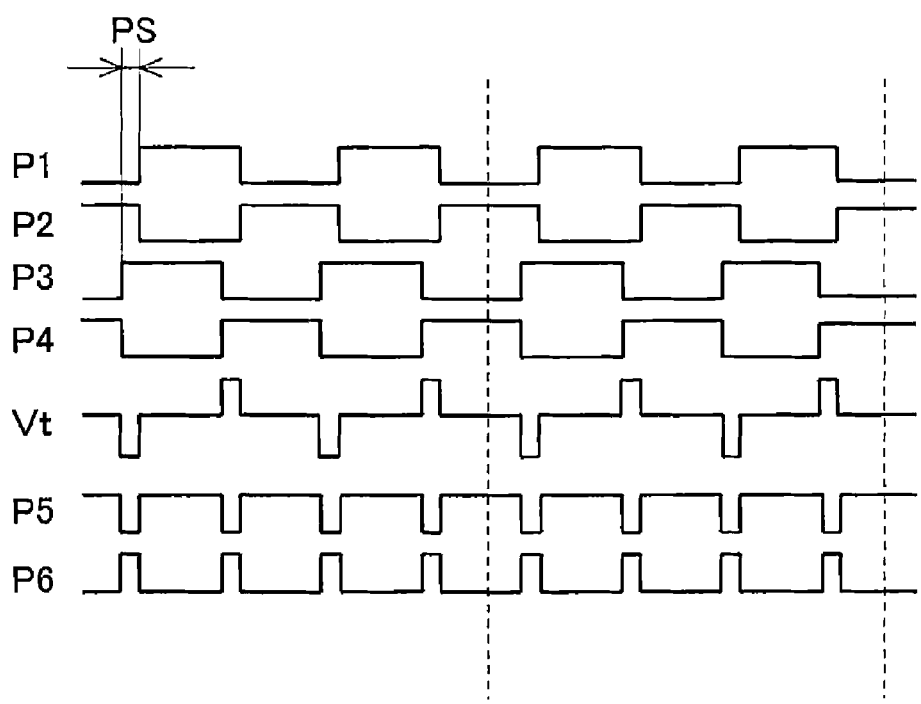
FIG. 3 is a timing chart for illustrating control over the DC/DC converter performed by a controller illustrated in FIGS. 1 and 2.

FIG. 3 is a timing chart for illustrating control over the DC/DC converter 20 performed by the controller 12 illustrated in FIGS. 1 and 2. As illustrated in this timing chart, the controller 12 turns ON/OFF the switches 211 to 214 according to PWM signals P1 to P4. The PWM signal P1 for performing PWM control over the switch 211 and the PWM signal P2 for performing PWM control over the switch 212 have a complementary relationship in which if one is ON, the other is OFF. In addition, the PWM signal P3 for performing PWM control over the switch 213 and the PWM signal P4 for performing PWM control over the switch 214 have a complementary relationship.

Further, the first switching circuit 21 is a phase-shift full-bridge switching circuit, and the PWM signals P2 and P4 are phase-shifted with respect to the PWM signals P1 and P3. A phase shift amount PS between the PWM signals P2 and P4 and between the PWM signals P1 and P3, and duties (time duty ratios) of the PWM signals P1 to P4 are feedback-controlled. For example, the controller 12 adjusts the phase shift amount PS and the duty, based on a difference with respect to a target value of the first voltage VL1 output from the first output system 24A and a difference with respect to a target value of the second voltage VL2 output from the second output system 24B.

The controller 12 applies a voltage Vt to the primary coil 221 from one end side (upper end side in FIG. 2) of the primary coil 221 when the PWM signal P1 is ON, and applies the voltage Vt to the primary coil 221 from the other end side (lower end side in FIG. 2) of the primary coil 221 when the PWM signal P2 is ON.

The controller 12 turns ON/OFF the first switch 241 and the second switch 242 in accordance with PWM signals P5 and P6. The PWM signal P5 for performing PWM control over the first switch 241 and the PWM signal P6 for performing PWM control over the second switch 242 have a complementary relationship in which if one is ON, the other is OFF. Duties of the PWM signals P5 and P6 are feedback-controlled. For example, the controller 12 sets the duty of the PWM signal P6 based on a difference with respect to a target value of the second voltage VL2 output from the second output system 24B, and generates the PWM signal P5 obtained by inverting ON/OFF of the PWM signal P6.

Next, the control over the first switch 241 and the second switch 242 of the second switching circuit 24 performed by the controller 12 according to the load states of the heater 5, the sub-battery 6, and the low-voltage auxiliary 7 will be described.

Figure 4:
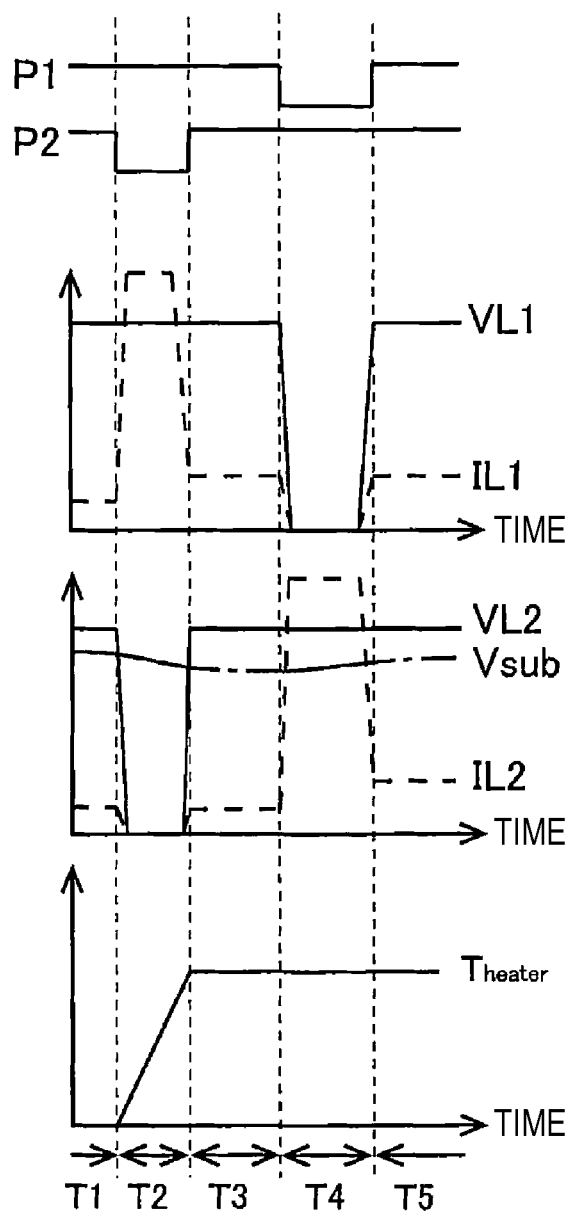
FIG. 4 is a timing chart for illustrating the control over the DC/DC converter performed by the controller illustrated in FIGS. 1 and 2.

FIG. 4 is a timing chart for illustrating the control over the DC/DC converter 20 performed by the controller 12 illustrated in FIGS. 1 and 2. As illustrated in this timing chart, when the load of the heater 5 is in a predetermined high-load state, the controller 12 sets the second switch 242 to a continuous OFF state and sets the first switch 241 to a continuous ON state. As the "predetermined high-load state" of the load of the heater 5, a state in which the heater 5 is turned on and a temperature of the heater 5 is raised toward a set temperature can be exemplified. In addition, as a "predetermined low-load state" of the load of the heater 5, a state in which the temperature of the heater 5 is stabilized after being raised to the set temperature can be exemplified.

Figure 5:
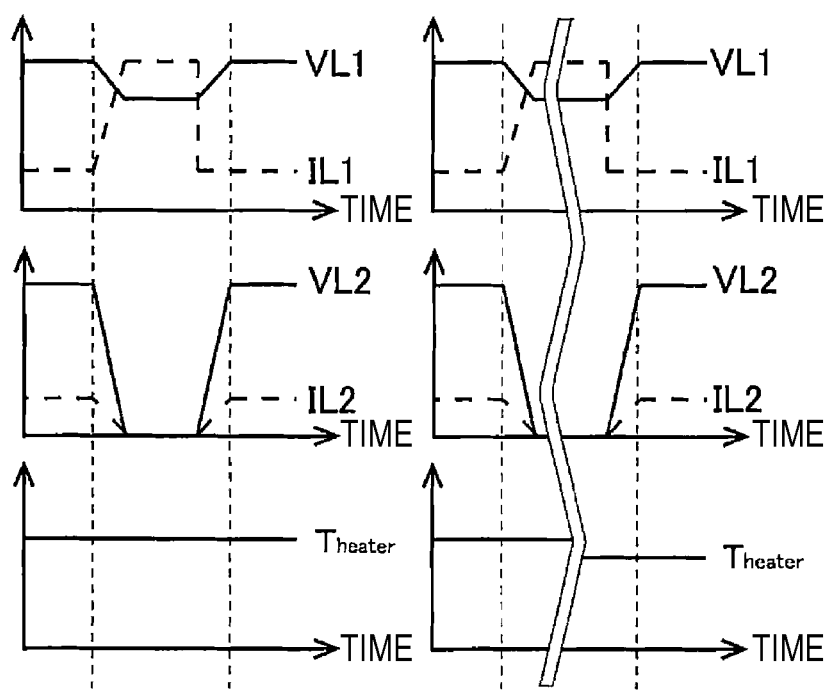
FIG. 5 is a timing chart illustrating a relationship between a temperature of a heater and output voltages and output currents of first and second output systems.

FIG. 5 is a timing chart illustrating a relationship between the temperature $T_{heater}$ of the heater 5, the first and second voltages VL1 and VL2, and first and second currents IL1 and IL2. The timing chart on the left side illustrates a state where the first auxiliary power-supply system 10A and the second auxiliary power-supply system 10B are momentarily shut off. The timing chart on the right side illustrates a state where the first auxiliary power-supply system 10A and the second auxiliary power-supply system 10B are continuously shut off for a certain period of time. The first current IL1 indicated by a broken line in FIG. 5 is a value of a current output from the first output system 24A, and the second current IL2 indicated by a broken line in FIG. 5 is a value of a current output from the second output system 24B.

As illustrated in the timing chart on the left side, when the first auxiliary power-supply system 10A is momentarily shut off, a temperature drop is not instantaneously caused because a heat capacity of the heater 5 is sufficiently large. That is, in response to momentary power-supply shutoff, the heater 5 does not cause an abnormal operation, and maintains the temperature $T_{heater}$. Further, as illustrated in the timing chart on the right side, even when the first auxiliary power-supply system 10A is shut off continuously for a certain period of time, the heater 5 maintains the temperature $T_{heater}$ for a while depending on magnitude of the heat capacity of the heater 5.

That is, supply of electric power from the first output system 24A to the heater 5 needs to be continuously performed when the load of the heater 5 is in the high-load state, but may be stopped when the load of the heater 5 is in the low-load state unless the low-load state lasts long. Therefore, in order to stabilize the outputs of the first output system 24A and the second output system 24B, as illustrated in the timing chart of FIG. 4, the controller 12 controls the output from the first output system 24A to the first auxiliary power-supply system 10A and the output from the second output system 24B to the second auxiliary power-supply system 10B.

The controller 12 determines whether the load of the heater 5 is in a high-load state or a low-load state based on a control signal for turning on/off the heater 5 or raising/lowering a temperature. For example, the controller 12 determines that the load of the heater 5 is in a high-load state, after elapse of a predetermined period of time since reception of the control signal for turning on the heater 5. Alternatively, the controller 12 determines whether the load of the heater 5 is in a high-load state or the low-load state based on a voltage output to the heater 5.

The controller 12 determines whether the load of the sub-battery 6 or the low-voltage auxiliary device 7 connected to the second auxiliary power-supply system 10B is in a high-load state or a low-load state based on a control signal for charging the sub-battery 6 or a control signal for turning on the low-voltage auxiliary device 7. For example, the controller 12 determines that the load of the sub-battery 6 is in a high-load state, after elapse of a predetermined period of time since reception of the control signal for charging the sub-battery 6. Alternatively, the controller 12 determines whether the load of the sub-battery 6 is in a high-load state or a low-load state based on a voltage Vsub of the sub-battery 6.

First, in a period T1, the heater 5 is in an OFF state, and the load of the heater 5 is in a low-load state. In addition, a state of charge of the sub-battery 6 is sufficiently high, and the load of the low-voltage auxiliary device 7 is also in a low-load state. In the period T1, the first output system 24A and the second output system 24B have low outputs.

Next, in a period T2 in which a temperature of the heater 5 is raised to the set temperature after the heater 5 is turned on, the controller 12 turns on the first switch 241 and turns off the second switch 242 to continuously supply electric power from the first output system 24A to the heater 5 and cut off supply of electric power from the second output system 24B to the second auxiliary power-supply system 10B. In the period T2, the second voltage VL2 of the second auxiliary power-supply system 10B is maintained by the sub-battery 6.

Next, in a period T3 in which the temperature $T_{heater}$ of the heater 5 is stabilized after being raised to the set temperature, the controller 12 turns on the first switch 241 and turns on the second switch 242. In the period T3, since the load of the heater 5 is in a low-load state, the output from the first output system 24A to the heater 5 is set to a low output, and the supply of electric power from the second output system 24B to the sub-battery 6 and the low-voltage auxiliary device 7 is restarted.

Next, for example, in a period T4 in which the load connected to the second auxiliary power-supply system 10B is in a high-load state, such as when the sub-battery 6 is charged, the controller 12 turns off the first switch 241 and turns on the second switch 242. In the period T4, the supply of electric power from the first output system 24A to the heater 5 is stopped, and an output of the second output system 24B is set to a high output. In the period T4, the heater 5 operates stably due to its own heat capacity.

Next, in a period T5 in which the load connected to the second auxiliary power-supply system 10B is in a low-load state, the controller 12 turns on the first switch 241 and turns on the second switch 242. In the period T5, by setting both the output from the first output system 24A and the output from the second output system 24B to low outputs, the temperature $T_{heater}$ of the heater 5 is maintained at the set temperature, the voltage Vsub of the sub-battery 6 is maintained constant, and the low-voltage auxiliary device 7 is normally operated.

As described above, in the power-supply control device 10 of the present embodiment, by using the second switching circuit 24 of a single-inductor multi-output type, the number of magnetic components such as the choke coil included in the DC/DC converter 20 is reduced, and the size of the DC/DC converter 20 is reduced. In addition, according to the power-supply control device 10 of the present embodiment, the supply of electric power to the first auxiliary power-supply system 10A and the second auxiliary power-supply system 10B is controlled in accordance with the state of the load of the heater 5 connected to the first auxiliary power-supply system 10A. Accordingly, since a required load can be suppressed, it is possible to stably supply electric power to the first auxiliary power-supply system 10A and the second auxiliary power-supply system 10B while suppressing an output capacity required for the main battery 2. Therefore, by reducing sizes of both the main battery 2 and the power-supply control device 10, the power-supply device 100 can be reduced in size, and electric power can be stably supplied to the first and second auxiliary power-supply systems 10A and 10B.

Here, when the load of the heater 5 is changed from a predetermined high-load state to a predetermined low-load state, the heater 5 maintains the temperature $T_{heater}$ by its own heat capacity even when the supply of electric power is reduced or cut off. Therefore, according to the control of the present embodiment in which the supply of electric power to the second auxiliary power-supply system 10B is restarted or the supply of electric power to the first auxiliary power-supply system 10A is cut off when the load of the heater 5 is changed from the predetermined high-load state to the predetermined low-load state, charging of the sub-battery 6 which is connected to the second auxiliary power-supply system 10B and driving of the low-voltage auxiliary device 7 which is connected to the second auxiliary power-supply system 10B can be normally performed while the heater 5 is caused to function without any trouble.

Further, in a period during which the supply of electric power to the second auxiliary power-supply system 10B is cut off when the load of the heater 5 is in the predetermined high-load state, the low-voltage auxiliary device 7 can be driven by supplying electric power from the sub-battery 6 to the low-voltage auxiliary device 7.

Further, in the second switching circuit 24 of a single-inductor multi-output type, when the load of the heater 5 is in the predetermined high-load state, the second switch 242 is set to a continuous OFF state so that the supply of electric power to the second auxiliary power-supply system 10B can be cut off, and when the load of at least one of the sub-battery 6 and the low-voltage auxiliary device 7 is in the predetermined high-load state, the first switch 241 is set to a continuous OFF state so that the supply of electric power to the first auxiliary power-supply system 10A can be cut off.

Although the present invention has been described based on the embodiment, the present invention is not limited to the embodiment described above. Modifications may be added to the above embodiment as appropriate without departing from the gist of the present invention, or known and well-known techniques may be combined as appropriate.

For example, although the second switching circuit 24 is a switching circuit of a SIMO type in the above embodiment, the second switching circuit 24 may be replaced with a switching circuit having the same function. In addition, although the first switching circuit 21 is a full-bridge type switching circuit in the above embodiment, the first switching circuit 21 may be replaced with a switching circuit having the same function.

Advantageous Effect

According to the present invention, by controlling supply of electric power to a first auxiliary power-supply system and a second auxiliary power-supply system in accordance with a state of a load of a heat generation electrical component connected to the first auxiliary power-supply system, it is possible to stably supply electric power to the first auxiliary power-supply system and the second auxiliary power-supply system even when the number of magnetic components such as choke coils provided in a voltage conversion circuit is reduced. Therefore, a power-supply device, which includes a main power-supply and a plurality of auxiliary power-supply systems, can be reduced in size, and electric power can be stably supplied to the plurality of auxiliary power-supply systems.

What is claimed is:

1. A power-supply control device that controls a power-supply device, the power-supply device including:
   a first auxiliary power-supply system to which a heat-generation electrical component driven by a first voltage is connected;
   a second auxiliary power-supply system to which a storage battery to be charged by a second voltage lower than the first voltage and a low-voltage load to be driven by the second voltage are connected; and
   a main power-supply,
the power-supply control device comprising:
   a voltage conversion circuit that steps down a power-supply voltage from the main power-supply and outputs the stepped-down power-supply voltage to the first auxiliary power-supply system and the second auxiliary power-supply system; and
   a control unit that stops supply of electric power from the voltage conversion circuit to the second auxiliary power-supply system when a load of the heat generation electrical component is in a predetermined high-load state, and supplies electric power from the voltage conversion circuit to the second auxiliary power-supply system when the load of the heat generation electrical component changes from the predetermined high-load state to a predetermined low-load state,
   wherein the control unit is further configured to determine, in a state in which the control unit has stopped the supply of electric power from the voltage conversion circuit to the second auxiliary power-supply system in response to determining that the load of the heat generation electrical component driven by the first voltage of the first auxiliary power-supply system is in the predetermined high-load state, whether the load of the heat generation electrical component changes from the predetermined high-load state to the predetermined low-load state, and to, in response to determining that the load of the heat generation electrical component changes from the predetermined high-load state to the predetermined low-load state in the state in which the control unit has stopped the supply of electric power from the voltage conversion circuit to the second auxiliary power-supply system in response to determining that the load of the heat generation electrical component driven by the first voltage of the first auxiliary power-supply system is in the predetermined high-load state, restart the supply of the electric power from the voltage conversion circuit to the second auxiliary power-supply system.

2. The power-supply control device according to claim 1, wherein the control unit stops supply of electric power from the voltage conversion circuit to the first auxiliary power-supply system when a load of at least one of the storage battery and the low-voltage load is in a predetermined high-load state, and supplies electric power from the voltage conversion circuit to the first auxiliary power-supply system when a load of at least one of the storage battery and the low-voltage load changes from the predetermined high-load state to a predetermined low-load state.

3. The power-supply control device according to claim 2, wherein the voltage conversion circuit includes
   a first switching circuit that steps down a power-supply voltage from the main power-supply by a switching operation of a switching element and outputs the stepped-down power-supply voltage from a transformer,
   an inductor to which electric power output from the transformer is input, and
   a second switching circuit of a single-inductor multi-output type that is connected to the inductor, the first auxiliary power-supply system, and the second auxiliary power-supply system, outputs the first voltage to the first auxiliary power-supply system, and outputs the second voltage to the second auxiliary power-supply system.

4. The power-supply control device according to claim 3, wherein the second switching circuit includes
   a first switch that is connected to the inductor and the first auxiliary power-supply system and is turned on/off by the control unit, and
   a second switch that is connected to the inductor and the second auxiliary power-supply system and is turned on/off by the control unit, and
   wherein the control unit sets the second switch to a continuous OFF state when a load of the heat generation electrical component is in the predetermined high-load state, and sets the first switch to a continuous OFF state when a load of at least one of the storage battery and the low-voltage load is in the predetermined high-load state.

5. The power-supply control device according to claim 1, wherein when supply of electric power from the voltage conversion circuit to the second auxiliary power-supply system is stopped by the control unit, electric power is supplied from the storage battery to the second auxiliary power-supply system.

6. The power-supply control device according to claim 1, wherein the voltage conversion circuit includes
   a first switching circuit that steps down a power-supply voltage from the main power-supply by a switching operation of a switching element and outputs the stepped-down power-supply voltage from a transformer,
   an inductor to which electric power output from the transformer is input, and
   a second switching circuit of a single-inductor multi-output type that is connected to the inductor, the first auxiliary power-supply system, and the second auxiliary power-supply system, outputs the first voltage to the first auxiliary power-supply system, and outputs the second voltage to the second auxiliary power-supply system.

7. A power-supply device for an electric vehicle including:
   a first auxiliary power-supply system to which a heat generation electrical component having a predetermined heat capacity and being driven by a first voltage is connected;
   a second auxiliary power-supply system to which a storage battery to be charged by a second voltage lower than the first voltage and a low-voltage load to be driven by the second voltage are connected;
   a main power-supply; and
   a power-supply control device configured to control the power-supply device,
   the power-supply control device comprising:
      a voltage conversion circuit that steps down a power-supply voltage from the main power-supply and outputs the stepped-down power-supply voltage to the first auxiliary power-supply system and the second auxiliary power-supply system; and
      a control unit that stops supply of electric power from the voltage conversion circuit to the second auxiliary power-supply system when a load of the heat generation electrical component is in a predetermined high-load state, and supplies electric power from the voltage conversion circuit to the second auxiliary power-supply system when the load of the heat generation electrical component changes from the predetermined high-load state to a predetermined low-load state, wherein the control unit is further configured to determine, in a state in which the control unit has stopped the supply of electric power from the voltage conversion circuit to the second auxiliary power-supply system in response to determining that the load of the heat generation electrical component driven by the first voltage of the first auxiliary power-supply system is in the predetermined high-load state, whether the load of the heat generation electrical component changes from the predetermined high-load state to the predetermined low-load state, and to, in response to determining that the load of the heat generation electrical component changes from the predetermined high-load state to the predetermined low-load state in the state in which the control unit has stopped the supply of electric power from the voltage conversion circuit to the second auxiliary power-supply system in response to determining that the load of the heat generation electrical component driven by the first voltage of the first auxiliary power-supply system is in the predetermined high-load state, restart the supply of the electric power from the voltage conversion circuit to the second auxiliary power-supply system.

8. The power-supply control device according to claim 1, wherein the control unit is configured to determine whether the load of the heat generation electrical component driven by the first voltage of the first auxiliary power-supply system is in the predetermined high-load state and to, in response to determining that the load of the heat generation electrical component driven by the first voltage of the first auxiliary power-supply system is in the predetermined high-load state, stop the supply of electric power from the voltage conversion circuit to the second auxiliary power-supply system.

\* \* \* \* \*